US008621604B2

(12) United States Patent
Chien (10) Patent No.: US 8,621,604 B2
(45) Date of Patent: Dec. 31, 2013

(54) EVALUATING A QUESTIONABLE NETWORK COMMUNICATION

(76) Inventor: Daniel Chien, Mercer Island, WA (US)

(*) Notice: Subject to any disclaimer, the term of this patent is extended or adjusted under 35 U.S.C. 154(b) by 1072 days.

(21) Appl. No.: 11/712,648

(22) Filed: Feb. 28, 2007

(65) Prior Publication Data
US 2007/0156900 A1 Jul. 5, 2007

Related U.S. Application Data (63) Continuation-in-part of application No. 11/470,581, filed on Sep. 6, 2006.

(60) Provisional application No. 60/714,889, filed on Sep. 6, 2005, provisional application No. 60/783,446, filed on Mar. 17, 2006.

(51) Int. Cl.
*G06F 11/00* (2006.01)

(52) U.S. Cl.
USPC .......................... 726/22; 709/229; 726/27

(58) Field of Classification Search
USPC ......................................................... 709/229
See application file for complete search history.

(56) References Cited

U.S. PATENT DOCUMENTS

| | | | |
|---|---|---|---|
| 6,502,135 B1 * | 12/2002 | Munger et al. ................ 709/225 |
| 6,654,796 B1 | 11/2003 | Slater et al. |
| 6,687,226 B1 * | 2/2004 | Galyas .......................... 370/231 |
| 6,888,834 B1 * | 5/2005 | Wood et al. ............... 370/395.41 |
| 7,111,163 B1 * | 9/2006 | Haney ........................... 713/153 |
| 7,143,175 B2 * | 11/2006 | Adams et al. ................. 709/229 |
| 7,346,770 B2 * | 3/2008 | Swander et al. ............. 713/153 |
| 7,363,656 B2 | 4/2008 | Weber et al. |
| 7,457,823 B2 | 11/2008 | Shraim et al. |
| 7,461,404 B2 | 12/2008 | Dudfield et al. |
| 7,536,723 B1 * | 5/2009 | Bhagwat et al. ................ 726/23 |
| 7,725,936 B2 | 5/2010 | Banerjee et al. |
| 7,797,436 B2 | 9/2010 | Banerjee et al. |
| 2002/0133721 A1 | 9/2002 | Adjaoute |
| 2003/0084349 A1 * | 5/2003 | Friedrichs et al. ............ 713/201 |
| 2003/0101357 A1 | 5/2003 | Ronen et al. |
| 2003/0149668 A1 * | 8/2003 | Lee et al. ........................ 705/51 |
| 2003/0149887 A1 | 8/2003 | Yadav |
| 2003/0149888 A1 | 8/2003 | Yadav |

(Continued)

OTHER PUBLICATIONS

International Search Report and Written Opinion for International Patent Application No. PCT/US06/35159 mailed Oct. 12, 2007.

(Continued)

*Primary Examiner* — Hamza Algibhah
(74) *Attorney, Agent, or Firm* — Lowe Graham Jones PLLC (57) ABSTRACT

Identifying a questionable network address from a network communication. In an embodiment, a network device receives an incoming or outgoing connection request, a web page, an email, or other network communication. An evaluation module evaluates the network communication for a corresponding network address, which may be for the source or destination of the network communication. The network address generally includes an IP address and a port number. The evaluation module checks a predefined white list for the network address to determine whether the network address is valid. Depending on the result, the evaluation module sets an indicator for preventing, allowing, or warning about the network communication. A category code, security code, organization code, or function code, may also be checked against the white list to ensure a valid network node is not compromised. A domain name may also be determined from the network address to further validate the network communication.

23 Claims, 5 Drawing Sheets

(56) References Cited

U.S. PATENT DOCUMENTS

| | | |
|---|---|---|
| 2003/0185395 A1* | 10/2003 | Lee et al. .................. 380/277 |
| 2003/0188190 A1 | 10/2003 | Aaron et al. |
| 2003/0217289 A1 | 11/2003 | Ammon et al. |
| 2004/0003285 A1 | 1/2004 | Whelan et al. |
| 2004/0068562 A1 | 4/2004 | Tilton et al. |
| 2004/0088537 A1* | 5/2004 | Swander et al. ............ 713/153 |
| 2004/0123141 A1 | 6/2004 | Yadav |
| 2004/0123157 A1 | 6/2004 | Alagna et al. |
| 2004/0162992 A1* | 8/2004 | Sami et al. .................. 713/200 |
| 2004/0186850 A1 | 9/2004 | Chowdhury et al. |
| 2004/0187034 A1 | 9/2004 | Tamura et al. |
| 2005/0047355 A1* | 3/2005 | Wood et al. ................. 370/310 |
| 2005/0060412 A1* | 3/2005 | Chebolu et al. ............. 709/227 |
| 2005/0076222 A1* | 4/2005 | Olkin et al. ................. 713/176 |
| 2005/0172229 A1 | 8/2005 | Reno et al. |
| 2005/0228899 A1* | 10/2005 | Wendkos et al. ............ 709/232 |
| 2006/0021031 A1 | 1/2006 | Leahy et al. |
| 2006/0031412 A1* | 2/2006 | Adams et al. ............... 709/219 |
| 2006/0059136 A1* | 3/2006 | Wooldridge et al. ............ 707/3 |
| 2006/0059238 A1* | 3/2006 | Slater et al. ................. 709/206 |
| 2006/0059337 A1 | 3/2006 | Poyhonen et al. |
| 2006/0069697 A1* | 3/2006 | Shraim et al. ............... 707/102 |
| 2006/0123464 A1 | 6/2006 | Goodman et al. |
| 2006/0123478 A1* | 6/2006 | Rehfuss et al. ................ 726/22 |
| 2006/0168022 A1* | 7/2006 | Levin et al. ................. 709/206 |
| 2006/0190993 A1 | 8/2006 | Noble |
| 2006/0203807 A1* | 9/2006 | Kouretas et al. ............. 370/352 |
| 2006/0212931 A1* | 9/2006 | Shull et al. .................... 726/10 |
| 2006/0230039 A1* | 10/2006 | Shull et al. ...................... 707/6 |
| 2006/0230272 A1* | 10/2006 | Lawrence et al. ........... 713/176 |
| 2006/0253903 A1* | 11/2006 | Krumel .......................... 726/13 |
| 2007/0006305 A1* | 1/2007 | Florencio et al. .............. 726/22 |
| 2007/0083670 A1* | 4/2007 | Kelley et al. ................ 709/245 |
| 2007/0268837 A1* | 11/2007 | Melton et al. ................ 370/252 |
| 2008/0077995 A1* | 3/2008 | Curnyn .......................... 726/27 |
| 2008/0147837 A1* | 6/2008 | Klein et al. .................. 709/223 |
| 2008/0172382 A1* | 7/2008 | Prettejohn ........................ 707/6 |
| 2009/0043765 A1* | 2/2009 | Pugh ................................ 707/6 |
| 2009/0287844 A1* | 11/2009 | Bailey .......................... 709/236 |

OTHER PUBLICATIONS

Horowitz, Michael, "Examples of Links That Lie," Sep. 2004, 11 pages, http://www.michaelhorowitz.com/linksthatlie.html (accessed Feb. 8, 2008).

"Netcraft Toolbar Tutorial," Netcraft Ltd, 4 pages, http://news.netcraft.com/archives/2004/12/29/netcraft_toolbar_tutorial.html (accessed Feb. 8, 2008).

U.S. Patent & Trademark Office, Official Communication for U.S. Appl. No. 11/470,581 mailed on Mar. 20, 2009, 7 pages.

International Search Report and Written Opinion mailed Apr. 23, 2008, which issued during the prosecution of International Patent Application No. PCT/US07/64102.

* cited by examiner

EVALUATING A QUESTIONABLE NETWORK COMMUNICATION

CROSS-REFERENCE TO RELATED APPLICATIONS

This application is a continuation-in-part (CIP) of U.S. Utility Application, titled "Identifying A Network Address Source For Authentication," Ser. No. 11/470,581 filed on Sep. 6, 2006, which claims the benefit of U.S. Provisional Application, titled "Identifying A Network Address Source For Authentication," Ser. No. 60/714,889 filed on Sep. 6, 2005, and U.S. Provisional Application, titled "Identifying A Network Address Source For Authentication," Ser. No. 60/783,446 filed on Mar. 17, 2006, the benefit of the earlier filing dates of which are hereby claimed under 35 U.S.C. §120 and 119(e), and the entire contents of each are incorporated herein by reference.

FIELD OF ART

The invention disclosed herein is directed to network security and more specifically to identifying a network address of a hacker, an intruder, a phishing source, a virus, an email sender, and/or other false or questionable source.

BACKGROUND

Today, through networks such as the Internet, there are intruders, hackers, unauthorized users, and programmed devices trying to breaking into other computers, servers, firewalls, routers, PDAs, cell phones, game consoles, and other electronic devices that connected to the network. For example, website servers, other devices, and users may send a virus, a worm, adware, spyware, or other files to another electronic device on the network. The files may cause the other device to run some malware (e.g., backdoors, worms, trojans, etc.) that may initiate a network connection to other equipment, such as a web server, to spread a virus, to get another virus, to send confidential information to others, and/or other undesirable actions. It is desirable to detect and prevent these actions from happening.

A file is often delivered by email, such as through a web-based email system. Although email messages typically include an identifier of the sender in a "From" field, it may be difficult to ensure that the sender identifier is valid. For instance, the From field of a phishing email may include an email address with a sender's domain name that appears to indicate a legitimate financial institution's email server. A user may have difficulty determining whether the sender identifier is authentic. In other cases, a network device may request accesses to a client device to deliver a web page, a pop-up advertisement, or other data. A domain name of the requesting network device may indicate a legitimate financial institution's server. Some security software provides a message with address information to a user. The user may choose whether to accept the request. However, many users have difficulty determining whether the sender's address information is authentic.

Another undesirable activity is referred to as phishing. The term phishing is generally associated with attempts to obtain personal and/or confidential information for illegal or unauthorized purposes. Typically, a deceitful person or organization sends one or more emails including a hyperlink to a phishing website that enables a user to enter personal and/or confidential information. Internet phishing websites make people believe that they are entering a real official website of a corporation or other organization. These phishing websites typically accomplish this by making their website look like official websites. General users then give out personal/confidential information without realizing that they have submitted the information to a phishing website, the operators of which may use the information for illegal or unauthorized purposes. The phishing website usually uses a uniform resource locator (URL) with a domain name that is very similar to the real official website. The domain name is also sometimes referred to as a domain name address (DNA). For example, a phishing website may use a DNA like www.paypal.billing.com to make people think this is an official website of Paypal, Inc. The underlying internet protocol (IP) address of the official looking domain name generally routes the user to the phishing web site rather than to an official website of the authentic company. Or the phishing website may use the official company domain name for the hyperlink, but use the phishing website IP address in the hyperlink. When the user clicks on the hyperlink in the email or on a web page, the user is directed to the phishing website rather than to the official website.

Resources on the internet or other network have their own unique IP address. Organizations, including companies, private organizations, government agencies, and the like are assigned their own unique IP address or a range of IP addresses. The same holds true for a phishing website. The phishing website, or other network node, cannot fake its IP address to be somebody else's official IP address due to the Internet IP network routing mechanisms. Even a phishing website has to use its own IP address in order for people to get to the phishing website. It is with respect to these and other issues that the invention is directed.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION

Embodiments of the present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" or "in an example embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

In this specification, the term "client" refers to a computing module's general role as an end processor of data or services, and the term "server" refers to a computing module's role as a provider of data or services to one or more clients. In general, it is possible that a computing module can act as a client, requesting data or services in one transaction and act as a server, providing data or services in another transaction, thus changing its role from client to server or vice versa.

The term "web" generally refers to a collection of devices, data, and/or other resources that are accessible over a network according to one or more protocols, formats, syntax, and/or other conventions that are intended for use with computing devices, such as personal computers, laptop computers, workstations, servers, mini computers, mainframes, cellular phones, personal digital assistants (PDAs), and the like. Web protocols include, but are not limited to, the hypertext transfer protocol (HTTP). Such conventions include, but are not limited to, hypertext markup language (HTML) and extensible markup language (XML). The terms "web page" and "web data" generally refer to a document, file, application, service, and/or other data that conforms to web conventions and is generally accessible with a computing device running an application such as a general purpose browser. Example general purpose browsers include Internet Explorer™ from Microsoft Corporation, Netscape™ from Netscape Communications Corp., and Firefox™ from the Mozilla Foundation. Web pages are generally indexed by search engines that are able to access web pages. An example search engine is Google™ by Google, Inc.

The term "URL" generally refers to a uniform resource locator, but may also include a uniform resource identifier and/or other address information. A URL generally identifies a protocol, such as hypertext transfer protocol (e.g., "http://"), a host name (e.g., "news.google.com) or a domain name (e.g., "google.com"), a path (e.g., "/intl/en/options"), and a specific file (e.g., "pack_installer.html") or a query string (e.g., "?hl=en").

Briefly, embodiments of the invention evaluate a network address against a list of known trusted addresses to validate a communication. Multiple tiers of security are provided. In one embodiment, a top tier is an IP address; a second tier is a port number; and a third tier is a property of a communication payload. Other tiers may be associated with other aspects of the communication. One or more ties can be selectively implemented. Each tier may be associated with a level of user involvement needed to approve a communication.

Illustrative Operating Environment

Figure 1:
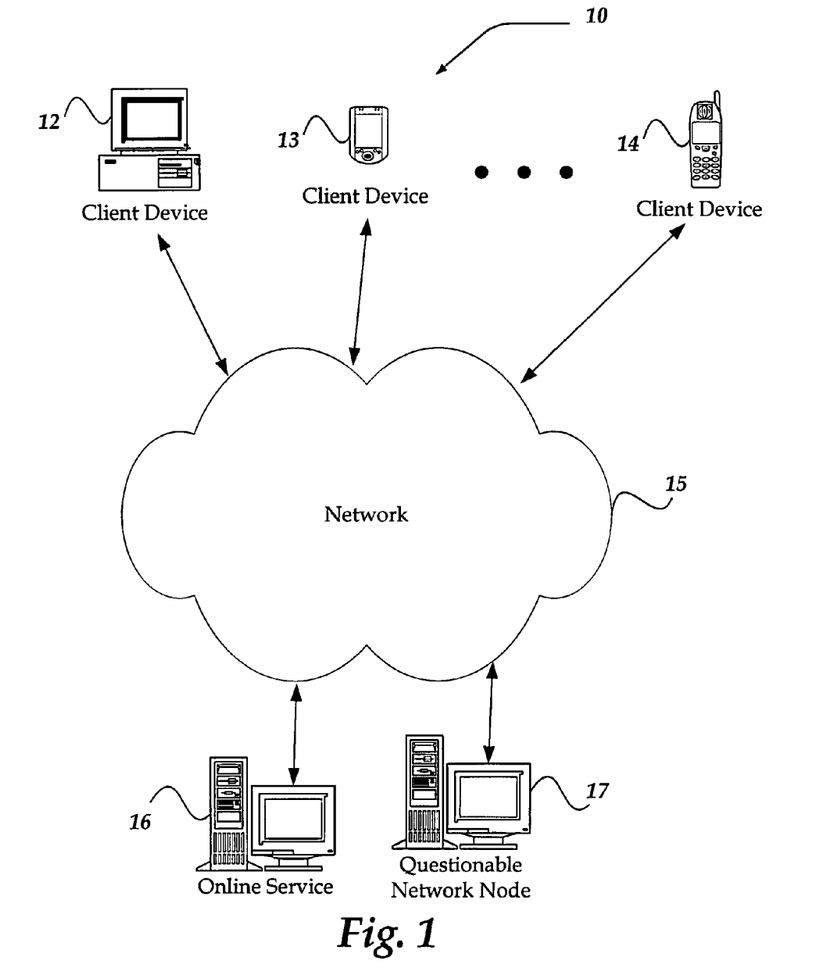
FIG. 1 shows a functional block diagram illustrating one embodiment of an environment for practicing the invention.

FIG. 1 illustrates one embodiment of an environment in which the present invention may operate. However, not all of these components may be required to practice the invention, and variations in the arrangement and type of the components may be made without departing from the spirit or scope of the invention.

As shown in the figure, a system 10 includes client devices 12-14, a network 15, an online service 16, and a questionable network node 17 that is not directly associated with the online service. Network 15 is in communication with and enables communication between each of client devices 12-14, online service 16, and questionable network node 17. Online service 16 may comprise one or more servers for a legitimate website, an email service, a file storage service, a domain name assignment service, a network address identification service, and the like. Questionable network node 17 may comprise a dishonest user's client device, a source of computer viruses, one or more servers for a website posing as another website, a valid network node that has been compromised by a hacker, or another network node used for illegitimate or misleading purposes. Each network node has a network address, such as an IP address that is unique to each network node. The network address generally also includes a port number to identify a specific communication session, a particular resource within a network node, or other refinement to the network address to enable proper communication between nodes. The true network address is needed for communication to or from a network node. Address masking, domain name translation, and other schemes may disguise a network address at various points along a communication path. However, the true network address is derived at some point, or the communication will not occur between the intended nodes.

Client devices 12-14 may include virtually any computing device capable of receiving and sending a message over a network, such as network 15, to and from another computing device, such as online service 16, each other, and the like. The set of such devices may include devices that are usually considered more general purpose devices and typically connect using a wired communications medium such as personal computers, multiprocessor systems, microprocessor-based or programmable consumer electronics, network PCs, and the like. The set of such devices may also include mobile terminals that are usually considered more specialized devices and typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, client devices 12-14 may be any device that is capable of connecting using a wired or wireless communication medium such as a personal digital assistant (PDA), POCKET PC, wearable computer, and any other device that is equipped to communicate over a wired and/or wireless communication medium.

Each client device within client devices 12-14 includes a user interface that enables a user to control settings, and to instruct the client device to perform operations. Each client device may also include a browser application that is configured to receive and to send web pages, web-based messages, and the like. The browser application may be configured to receive and display graphics, text, multimedia, and the like, employing virtually any web based language, including, but not limited to Standard Generalized Markup Language (SGML), HyperText Markup Language (HTML), Extensible Markup Language (XML), a wireless application protocol (WAP), a Handheld Device Markup Language (HDML), such as Wireless Markup Language (WML), WMLScript, JavaScript, and the like. Client devices 12-14 may be further configured with a communication interface that enables the client device to send and receive messages from another computing device employing the same or a different communication mode, including, but not limited to email, instant messaging (IM), short message service (SMS) messaging, multi-media message service (MMS) messaging, internet relay chat (IRC), Mardam-Bey's internet relay chat (mIRC), Jabber, and the like.

Network 15 is configured to couple one computing device to another computing device to enable them to communicate. Network 15 is enabled to employ any form of medium for communicating information from one electronic device to another. Also, network 15 may include a wired interface, such as an Internet interface, and/or a wireless interface, such as a cellular network interface, in addition to an interface to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize cellular telephone signals over air, analog telephone lines, full or fractional dedicated digital lines including T1, T2, T3, and T4, Digital Signal level 3 (DS3), Optical Carrier 3 (OC3), OC12, OC48, Asynchronous Transfer Mode (ATM), Integrated Services Digital Networks (ISDNs), Digital Subscriber Lines (DSLs), wireless links including satellite links, or other communications links that are equivalent and/or known to those skilled in the art. Furthermore, remote computers and other related electronic devices could be remotely connected to either LANs or WANs via a modem and temporary telephone link. In essence, network 15 includes any communication method by which information may travel between client devices 12-14, online service 16, and/or questionable network node 17. Network 15 is constructed for use with various communication protocols including transmission control protocol/internet protocol (TCP/IP), user datagram protocol (UDP), WAP, code division multiple access (CDMA), global system for mobile communications (GSM), and the like.

The media used to transmit information in communication links as described above generally includes any media that can be accessed by a computing device. Computer-readable media may include computer storage media, wired and wireless communication media, or any combination thereof. Additionally, computer-readable media typically stores and/or carries computer-readable instructions, data structures, program modules, or other data that can be provided to a processor. Computer-readable media may include transmission media for transmitting a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wireless media such as acoustic, RF, infrared, and other wireless media, and wired media such as twisted pair, coaxial cable, fiber optics, wave guides, and other wired media.

One embodiment of an electronic device is described in more detail below in conjunction with FIG. 2. For discussion purposes, a general purpose client computing device is described as an example. However, a server device, a special purpose device (e.g., cell phone), and/or other electronic device may be used in embodiments of the invention. In this example, a client device 20 may include any computing device capable of connecting to network 15 to enable a user to communicate with other network resources, such as client devices, portal server 16, and/or questionable network node 17. Client device 20 may include many more components than those shown. The components shown, however, are sufficient to disclose an illustrative embodiment for practicing the invention. Many of the components of client device 20 may also be duplicated in a server of online service 16, a server of questionable network node 17, and/or other electronic devices.

As shown in the figure, client device 20 includes a processing unit 22 in communication with a mass memory 24 via a bus 23. Mass memory 24 generally includes a RAM 26, a ROM 28, and other storage means. Mass memory 24 illustrates a type of computer-readable media, namely computer storage media. Computer storage media may include volatile and nonvolatile, removable and non-removable media implemented in any method or technology for storage of information such as computer readable instructions, data structures, program modules or other data. Other examples of computer storage media include EEPROM, flash memory or other semiconductor memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

Mass memory 24 stores a basic input/output system ("BIOS") 30 for controlling low-level operation of client device 20. The mass memory also stores an operating system 31 for controlling the operation of client device 20. It will be appreciated that this component may include a general purpose operating system such as a version of Windows™, UNIX, LINUX™, or the like. The operating system may also include, or interface with a virtual machine module that enables control of hardware components and/or operating system operations via application programs.

Mass memory 24 further includes one or more data storage units 32, which can be utilized by client device 20 to store, among other things, programs 34 and/or other data. Programs 34 may include computer executable instructions which can be executed by client device 20 to implement an HTTP handler application for transmitting, receiving and otherwise processing HTTP communications. Similarly, programs 34 can include an HTTPS handler application for handling secure connections, such as initiating communication with an external application in a secure fashion. Other examples of application programs include schedulers, calendars, web services, transcoders, database programs, word processing programs, spreadsheet programs, and so forth. Accordingly, programs 34 can process web pages, audio, video, and enable telecommunication with another user of another electronic device.

In addition, mass memory 24 stores one or more programs for messaging and/or other applications. A messaging client module 36 may include computer executable instructions, which may be run under control of operating system 31 to enable email, instant messaging, SMS, and/or other messaging services. Similarly, a server device configured much like client device 20 (and/or client device 20 itself) may include a messaging server module 37, which provides routing, access control, and/or other server-side messaging services. Client device 20 may further include an evaluation module 38, which generally evaluates communications for valid senders, requests, and/or other data. In one embodiment, evaluation module 38 may comprise an anti-phishing modile, which interacts with a phishing website to enable client device 20 to identify the phishing website's network address and may determine whether the network address is associated with an illegitimate website. Another example embodiment comprises an authorization module, which may check email messages, file downloads, redirections, and/or other communications. Evaluation module 38 may be implemented separate from other applications, may be implemented as a plug-in to another application (such as a browser), may be implemented directly within another applications (such as an email application), may be implemented as a server application, and/or other forms.

Figure 2:
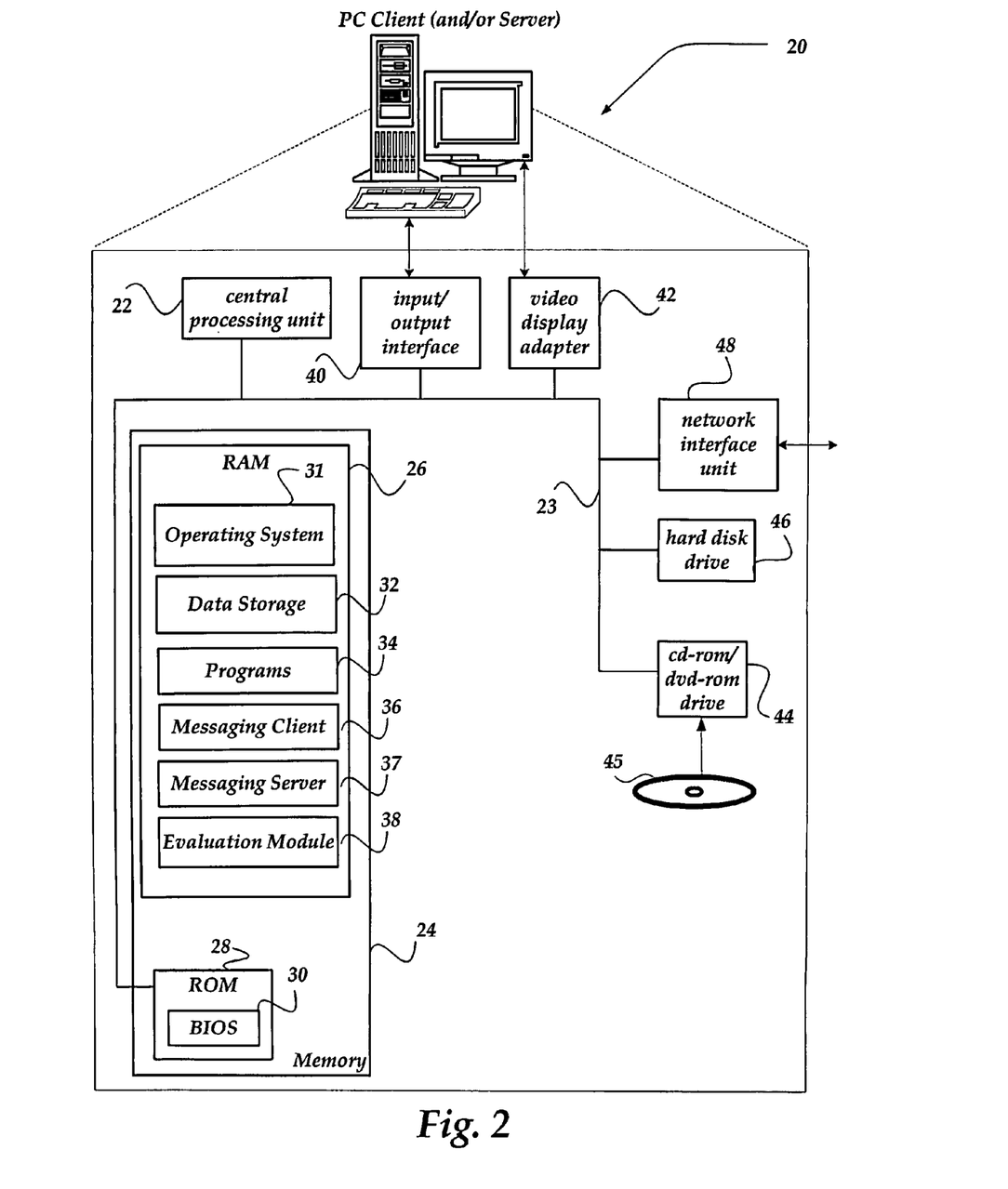
FIG. 2 shows one embodiment of a client and/or server device that may be included in a system implementing the invention.

Client device 20 also includes an input/output interface 40 for communicating with input/output devices such as a keyboard, mouse, wheel, joy stick, rocker switches, keypad, printer, scanner, and/or other input devices not specifically shown in FIG. 2. A user of client device 20 can use input/output devices to interact with a user interface that may be separate or integrated with operating system 31 and/or programs 34-38. Interaction with the user interface includes visual interaction via a display, and a video display adapter 42.

For some client devices such as a personal computer, client device 20 may include a removable media drive 44 and/or a permanent media drive 46 for computer-readable storage media. Removable media drive 44 can comprise one or more of an optical disc drive, a floppy disk drive, and/or a tape drive. Permanent or removable storage media may include volatile, nonvolatile, removable, and non-removable media implemented in any method or technology for storage of information, such as computer readable instructions, data structures, program modules, or other data. Examples of computer storage media include a CD-ROM 45, digital versatile disks (DVD) or other optical storage, magnetic cassettes, magnetic tape, magnetic disk storage or other magnetic storage devices, RAM, ROM, EEPROM, flash memory or other memory technology, or any other medium which can be used to store the desired information and which can be accessed by a computing device.

Via a network communication interface unit 48, client device 20 can communicate with a wide area network such as the Internet, a local area network, a wired telephone network, a cellular telephone network, or some other communications network, such as network 15 in FIG. 1. Network communication interface unit 48 is sometimes known as a transceiver, transceiving device, network interface card (NIC), and the like.

Exemplary Implementation

To make it easier for users to remember network addresses, a domain name like www.cnn.com is associated with a numerical IP address. The domain name is also sometimes referred to as the domain name address (DNA). Additional information may be added to the domain name, such as a path, to specify a uniform resource identifier (URI), which is typically associated with a numerical uniform resource locator (URL) that specifies the network location of a resource such as a markup document, image, or other data. A central database is typically used to maintain the association between IP addresses and corresponding domain names. Generally, a domain name server (DNS), an internet service provider (ISP), or other database maintains the associations. In an example embodiment involving the internet, an organization such as the Internet Corporation for Assigned Names and Numbers (ICANN), the Internet Assigned Numbers Authority (IANA), or other assigning organization maintains associations between domain names and IP addresses. An owner name, country, and/or other information is also associated with each IP address.

Multiple embodiments are possible to identify a questionable network node. For example, embodiments of the invention can identify a phishing website. Although not limited to the following, two examples are described below.

1. Phishing website IP address—If a phishing website provides its IP address directly to a client, the IP address is checked with a local database or an assigning authority. By querying the website's IP address against a local assignment database or against the database of ICANN, IANA, or other assigning organization, the website's owner is identified.

2. Phishing website domain name—In general, the IP address is usually not provided directly. Instead, a domain name like www.cnn.com is usually provided. By querying the domain name against a DNS, the corresponding IP address can be found. Upon querying this IP address against a local assignment database or the database of ICANN, IANA, or other assigning organization, the website's owner is identified. Those skilled in the art will recognize that the two steps may be done by a single service.

Multiple embodiments are also possible for different applications. Although not limited to the following, three examples are described below.

A) Embedded function—An application program includes an embedded function that evaluates a link in a document. For instance, an email program, IM program, or a word processing program includes a menu option or button to activate an embedded function for evaluating a link in a message or a document. The user can activate the function, or the function may run automatically upon detecting a link in the document. The function access the address associated with the link to get back the IP address and port number. The function queries a local or remote assignment database to get the owner's name and country. The function may display the owner's name and country, such as when the user positions the mouse pointer over the link, and/or in a predefined screen location. The function may additionally, or alternatively, compare the owner's name and address to a database of know owners associated with domain names. A warning is displayed upon mouse-over or in a predefined screen location.

B) Browser display—Similarly, a browser is modified directly, or with a plug-in, to provide one or more new fields, showing an IP address owner's name and country associated with a current URL or webpage being rendered by the browser. In addition, the browser may issue a visual, audio, or other warning, if the owner of the current domain name does not match a known owner's name and country for the domain.

C) An online service—A user can submit a URL or domain name through a webpage field to an online query service and receive the domain name owner's real name and country. The online service takes the risk of accessing the URL to obtain the IP address. The online service may return the IP address to the client of the submitting user for further evaluation. Alternatively, the online service may determine the owner's name and country and compare this information with a database of known owner's and countries corresponding to the submitted domain name. The online service then sends the owner's name and country to the client of the submitting user. The online service or the client webpage issues a warning to the user if the domain name is not associated with the domain name owner's real name and country.

Further detail is now provided for determining an owner and county. IP addresses (e.g., for IP V4 or V6) are generally assigned in a delegated manner. Users may be assigned IP addresses by ISPs. ISPs generally obtain allocations of IP addresses from a local Internet registry (LIR), from a national Internet registry (NIR), or from one or more appropriate Regional Internet Registries (RIRs):

AfriNIC (African Network Information Centre)—Africa Region (http://www.afrinic.net/)
APNIC (Asia Pacific Network Information Centre)—Asia/Pacific Region (http://www.apnic.net/)
ARIN (American Registry for Internet Numbers)—North America Region (http://www.arin.net/)
LACNIC (Regional Latin-American and Caribbean IP Address Registry)—Latin America and some Caribbean Islands (http://lacnic.net/en/index.html)
RIPE NCC (Réseaux IP Européens)—Europe, the Middle East, and Central Asia (http://www.ripe.net/)

Registry organizations typically operate servers that maintain the associations between domain names and IP addresses. Such servers are sometimes referred to as "whois" servers. By querying one or more of the above website servers, the IP address owner's name and country can be found. The querying can be performed by having the browser send an HTTP request to the appropriate server(s), and obtain a response. Alternatively, one local database, such as a client browser database, or other local or cached database can include one or all databases of "whois" servers to make the query easier and faster. Once the owner and/or country is identified, a user or an automated process can determine whether the website is authentic or a phishing website.

Similar to DNS databases, public whois databases may not be entirely reliable. Owners of phishing websites may register with the whois registry to take advantage of the registry for themselves. To counteract this potential issue, a local database may be used to supplement or replace the information from public "whois" servers to enhance the resolution of the name of the owner. For example, a legitimate company name may not be obviously recognized from a "whois" server. The supplemental database can provide more precise information, such as a unique code, about this company along with its IP address. In another example, legitimate financial institutions, companies, or government organization can be separately verified and authenticated before being added to this supplemental database.

In some situations, the IP address identifies a proxy server, a network address translation (NAT) server, a firewall, and/or other network intermediaries. To find out the true IP address of a potential phishing website (or other illegitimate resource), the network intermediary device, its owner, or other authorized entity checks one or more intermediary mapping tables, log files, and/or other mapping data. From this intermediary mapping data, the authorized entity maps a timestamp and/or TCP port number to internal IP address information. The internal IP address can be checked against internally assigned names to determine a name, a location, and/or other internal information. Obtaining such internal information generally involves cooperation from an internet service provider, from an owner of the network intermediary, and/or from other sources. This additional internal information can be provided to a client or to a trusted evaluation service to determine whether a website is valid or a phishing website.

In one embodiment, a log file or mapping data may have the following information for reverse lookup:

1. timestamp
2. Internal/Local data, such as an internal IP address to a potential phishing website, to a potential hacker's account, to an internal file, and/or to another internal resource.
3. External network data, such as Internet source and/or destination IP address, source and/or TCP/UDP port number, and/or other data that identifies mapping information to a potential phishing website, to a potential hacker's account, and/or to another source. For instance, an intermediary gateway log file may include a source IP address and a source TCP port number from which a spammer sent an email with a link to a phishing website. The log file may also include a destination IP address and destination port number to which the email message was sent. Similarly, a log file may include an intermediary gateway log file may include a source IP address and a source TCP port number from which a hacker attempted to access a destination IP address and destination port number. Often, port number 80 or 443 is used. If these port numbers are not returned, the link may be associated with a phishing website. Conversely, if a valid website intentionally uses a port number other than 80 or 443, and the returned port number is 80 or 443, the corresponding link may be associated with a phishing website.

Figure 3:
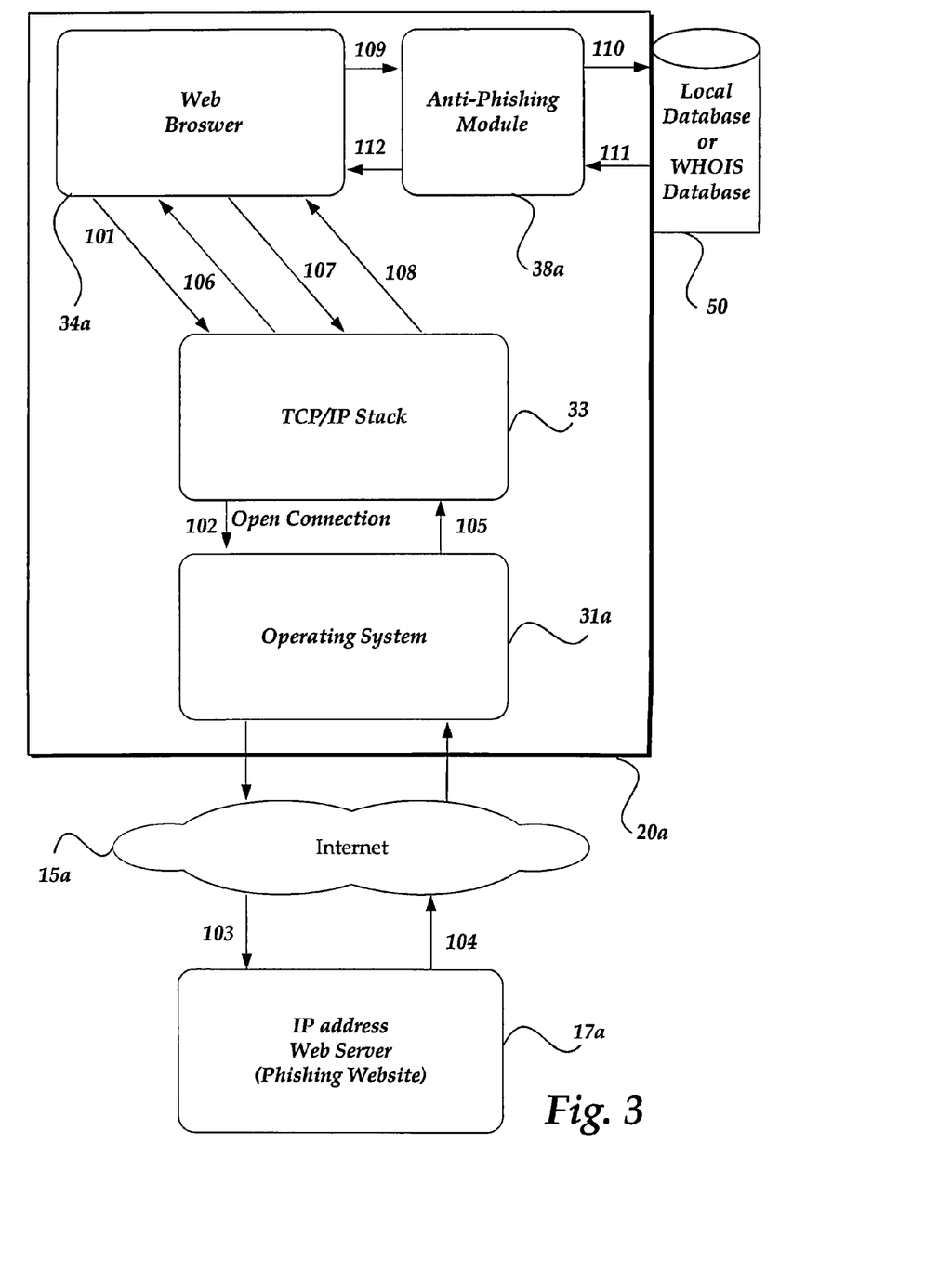
FIG. 3 illustrates an architecture and communication sequence for one embodiment of the present invention.

FIG. 3 illustrates an architecture, communication sequence, and method for one embodiment of the present invention. Not all of the illustrated modules may be required to practice the invention, or additional modules may be included for other embodiments. In various embodiments, some modules may be combined, while other modules may be divided into multiple modules.

In this example embodiment, the architecture includes a client 20*a* that communicates through a public internet 15*a* to an IP address web server 17*a* that corresponds to a phishing website. Client 20*a* includes an operating system 31 in communication with internet 15*a* and in communication with a TCP/IP stack 33. TCP/IP stack 33 is in communication with a web browser 34*a*, which is in communication with an anti-phishing module 38*a*. The anit-phishing module is in communication with a network address database 50, which may be a local database in client 20*a* or may be a remote network database, such as a network address registry database available through a local network or through internet 15*a*. Network address database 50 generally stores an association between IP addresses and domain names and their owners.

A user of client 20*a* may receive an email that includes a link, or may view a link in a web page rendered by browser 34*a*. The link may appear valid, but the user may not be certain of the link's validity. The user may position a mouse pointer over the link or select the link. In one embodiment, the user may position the mouse pointer over the link and press a right button on the mouse to select a menu option to invoke anti-phising module 38*a* for checking the link. In another embodiment, the user may simply select the link. The following discussion describes an embodiment in which the user selects the link through web browser 34*a*. However, those skilled in the art will recognize that a messaging service, such as email, and/or other applications may be used. Similarly, those skilled in the art will recognize that a passive check of the link may be performed through a menu option available when a right mouse button is pressed.

In this example embodiment, browser 34*a* detects user selection of the link and sends a request for the corresponding web page at a communication step 101. The request is first sent to TCP/IP stack 33 to resolve the link URL into an IP address. Resolving the URL may require accessing a network address registry database, an internet service provider (ISP), or other source that associates the URL with its corresponding IP address. However, the IP address from such a source may be masked or otherwise misleading. Also, the port number is not necessarily obtained by resolving the URL. To ensure that the true IP address and port number is obtained, TCP/IP stack 33 sends the request through to operating system 31a at a communication step 102, and the operating system makes a TCP connection through the internet to the questionable network node 17a, at a communication step 103.

Questionable network node 17a (e.g., its corresponding server) returns the requested web page at a communication step 104. Also returned is the accurate IP address and port number of the phising website. Client operating system 31a receives the web page, address, and port number and passes this information to TCP/IP stack 33 at a communication step 105. The TCP/IP stack passes the web page to browser 34a at a communication step 106. At a communication step 107, the browser requests the IP address and port number from the TCP/IP stack. For example, the browser may invoke a GetIPAddressByName object or a GetHostByName object. The TCP/IP stack returns the IP address and port number to the browser at a communication step 108.

Browser 34a then passes the IP address, port number, and URL (or domain name or host name) to an anti-phishing module 38a, at a communication step 109. The anti-phishing module uses this information to request the owner name, country, and/or other identification data (if available) from database 50, at a communication step 110. Database 50 returns the requested information to anti-phishing module 38a, at a communication step 111. Anti-phishing module 38a may pass the information directly to browser 34a for display. However, in one embodiment, anti-phishing module 38a determines whether the owner name and country match the known information for the domain name of the URL. If a match is not found, anti-phishing module then sends an instruction at a communication step 112 for browser 34a to display a warning.

Figure 4:
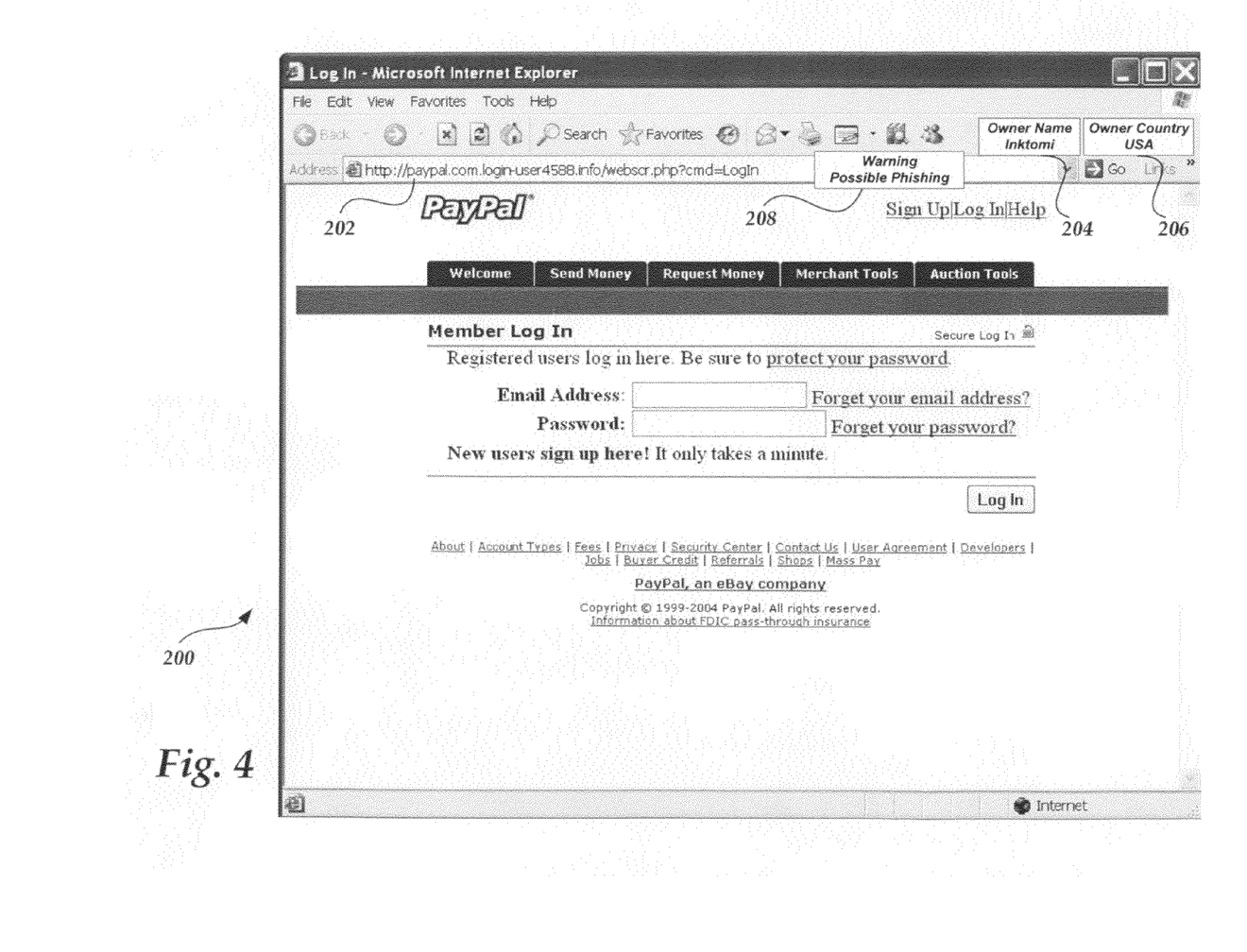
FIG. 4 illustrates a screen shot for one embodiment of the present invention.

FIG. 4 illustrates a screen shot of a web page 200 for one embodiment of the present invention. In this example, a phishing website poses as an official website of a company such as Paypal, Inc. A uniform resource locator (URL) 202 is shown in the browser address field. The URL was accessed via a hyperlink from an unsolicited email. The IP address associated with the domain name of the URL is 68.142.234.59. The associated IP address owner's name 204 and country 206 are displayed near the domain name address shown in a browser address field. A user, an anti-phishing plug-in, and/or other decision module may compare the owner's name and country with the domain name to determine authenticity. Some comparisons are relatively easy. For example, if an IP owner's name is an unknown organization or an individual's name, and the domain name indicates a well known company, there may be a weighted decision against the IP owner being the authentic owner of the domain name. Similarly, if the IP owner's country is one that has a history of counterfeit activities or is far from the home country of the known company, there may be further weighting against the IP owner being an authentic owner of the domain name. The IP address may also be simply compared with a known IP address, or range of addresses of the known company. The weighted information may lead to a decision that the IP address is not an authentic website, and is a phishing website.

As shown in FIG. 4, web page 200 appears to be that of Paypal, Inc. The IP owner 202 is displayed as Inktomi, Inc., which is a valid company. However, the IP address associated with the domain name www.paypay.com is 216.113.188.67. A large organization may have many IP addresses, so it may be unclear whether an IP address is owned by a valid organization. The country 206 associated with the IP address of the URL is the United States, which also appears valid. Thus, additional information may be used. In this example, it is known that Paypal, Inc. is owned by the company Ebay, Inc., which is not associated with Inktomi, Inc. Thus, the shown website is likely to be a phishing web site. An optional warning 208 is displayed in another browser field, in a pop-up window, and/or in another way.

Further Exemplary Implementation

In an IP network, such as the Internet, a connection or session between two nodes is generally made using IP addresses and TCP/UDP port numbers. Either node is aware of its own and the other node's IP address and port number. The port is generally an endpoint to a network node. The port number typically represents a specific communication session, a specific function, a specific resource, or other identity within this network node. Port numbers are generally divided into three ranges: Well Known Ports, Registered Ports, and Dynamic and/or Private Ports. The Well known Ports are generally assigned by an assignment service, such as IANA. Registered Ports may be optionally registered for desired purposes. Dynamic or Private Ports are generally used by a network node for frequently changing communications and/or for private purposes.

For an outbound connection request to another node, a client uses the other node's IP address and port number. For an inbound connection, such as to a client, the requester will identify its IP address and port number. If an intermediary node is used, such as an internet service provider server, the intermediary node will generally know each node's IP address and port number. For example, a server will generally know the IP address and local port number of both a requesting node and a client node, so that the intermediary server can relay communications between the requesting node and the client node.

Similarly, for downloading a file that is initiated by a server or a client, the IP addresses and port numbers are known. For instance, if the download is from a website or other network service, the IP address and port number of a network node that provides the file can be determined from a public or local assignment database, as discussed above. In some circumstances, the IP address and port number may be those of a valid, trustworthy network node. However, a hacker may access the trustworthy node and attempt to distribute a virus or other undesirable file. In this case, an embodiment of the invention evaluates the payload of the communication. In one embodiment, an evaluation module evaluates the payload of a packet to determine and check payload data against a category identifier that indicates allowable data. In another embodiment, the evaluation module evaluates an overall file extension, file author, creation date, and/or other properties of a file to be transferred, to determine whether the file should be blocked and/or a warning issued. For example, it may be acceptable to download a news document from a trusted network node, but not download executable code. One or more category codes can be associated with the IP address and port number of each trustworthy node to indicate those types of payload data, download files, or other data that are allowed.

The IP address, port number, and category code are stored in a file, database, and/or other data source that identifies network nodes and files that are valid and/or otherwise trusted. Such a data source is sometimes referred to herein as a white list. A white list is generally distinct from a black list that specifically identifies addresses, nodes, data sources, or other information that is to be blocked or otherwise not trusted. For example, a white list used for certain embodiments of the invention does not include IP addresses for any unauthenticated network nodes or any anonymous proxy servers.

The white list may be a subset of an IANA WHOIS database. It may identify network nodes of only legitimate financial institutions, reputable websites, reputable download websites, reputable antivirus company websites, and/or other service providers. Such service providers may include an ISP. Thus, the white list may be modified during installation or otherwise, to include IP addresses and other information associated with one or more internet service providers. Service providers may need to access client equipment, other internet nodes that a client node may need to access, or some other network node that has permission to access a certain device for a specific function. In addition, a white list may include an address owner's name, domain name, category code, and other information. A white list may be stored at a client, at a server that provides a file, at an intermediary node in the communication, or at a neutral node that is not directly part of the communication between two end nodes. Multiple white lists may be used at a single, or multiple nodes, to accommodate masked network addresses, proxy servers, and the like. For example, multiple white lists may be distributed to various routers or other nodes to perform intermediary checks as a message, web page, or other communication moves along a communication path.

Embodiments of the invention can be implemented to provide multiple tiers of security. A top tier is the IP address. A second tier is the port number. A third tier is the category. Other tiers may be associated with other aspects of the communication. Depending on application requirements, an embodiment may apply various levels of evaluation. One embodiment may only perform a first tier evaluation by checking a white list for a trusted IP address. For higher security, an embodiment may check all three tiers. An administrator may set a level of evaluation in an evaluation module.

Other information in the white list may include a security rating, which is used to indicate whether user interaction is need. For example, for a highest security rating, an evaluation module will automatically perform its evaluation and make all decisions. For another security rating, a user interaction may be needed to allow a communication, a file download, or other action associated with a questionable network node. For a lowest rating, the evaluation module may automatically block communication, file download, or other access. In addition, or alternatively, the security rating may be confirmed or separately determined while checking a communication. For example, if the IP address, port number, and category code matches those in the white list, the evaluation module may indicate a high security rating. If the IP address and port number match, but the category code does not match, the evaluation module may determine an intermediate security rating, and request a user instruction on how to proceed. If the IP address and port number do not match those in the white list, the evaluation module may determine a lowest security rating. The evaluation module and/or other applications can take different actions, depending on the security rating.

Multiple scenarios exist in which an evaluation module may identify a high risk network node. Although not limited to the following, some examples include:

1. For an outbound connection request, like visiting a website, an FTP (File Transfer Protocol) site, or other network node, the destination node's IP address and port number are checked. If the destination node's IP address and port number are not in the white list, or otherwise considered a high risk, the evaluation module can prevent the connection, give a warning, require a user approval, require additional authentication of the destination node, or perform another predefined action. If the user were to approve the connection, the destination node's IP address, port number, and/or other information would be added to the white list.
2. For an inbound connection request, the requesting node's IP address and local device port number are checked against the white list. This can stop an intruder, a hacker or other unauthorized user from gaining access to the receiving device. The receiving device (or an intermediary node) can refuse the connection, give a warning, require a user approval, require additional authentication of the requesting node, or perform another predefined action. If the user were to approve the connection, the requesters node's IP address, port number, and/or other information would be added to the white list.
3. For file transfer, the source node can be checked before a file is downloaded. Conversely, a destination node can be checked before a file is sent to a questionable node. As discussed above, the IP address, port number, and file type can be checked against the white list. Similar to the connection scenarios, the evaluation module can prevent the file transfer, require a user approval, require additional authentication of the requesting node, or perform another predefined action. If the user were to approve the file transfer, the questionable node's IP address, port number, and/or other information would be added to the white list. The file extension would also be stored as a category along with the corresponding IP address, port number, and/or other information.

Figure 5:
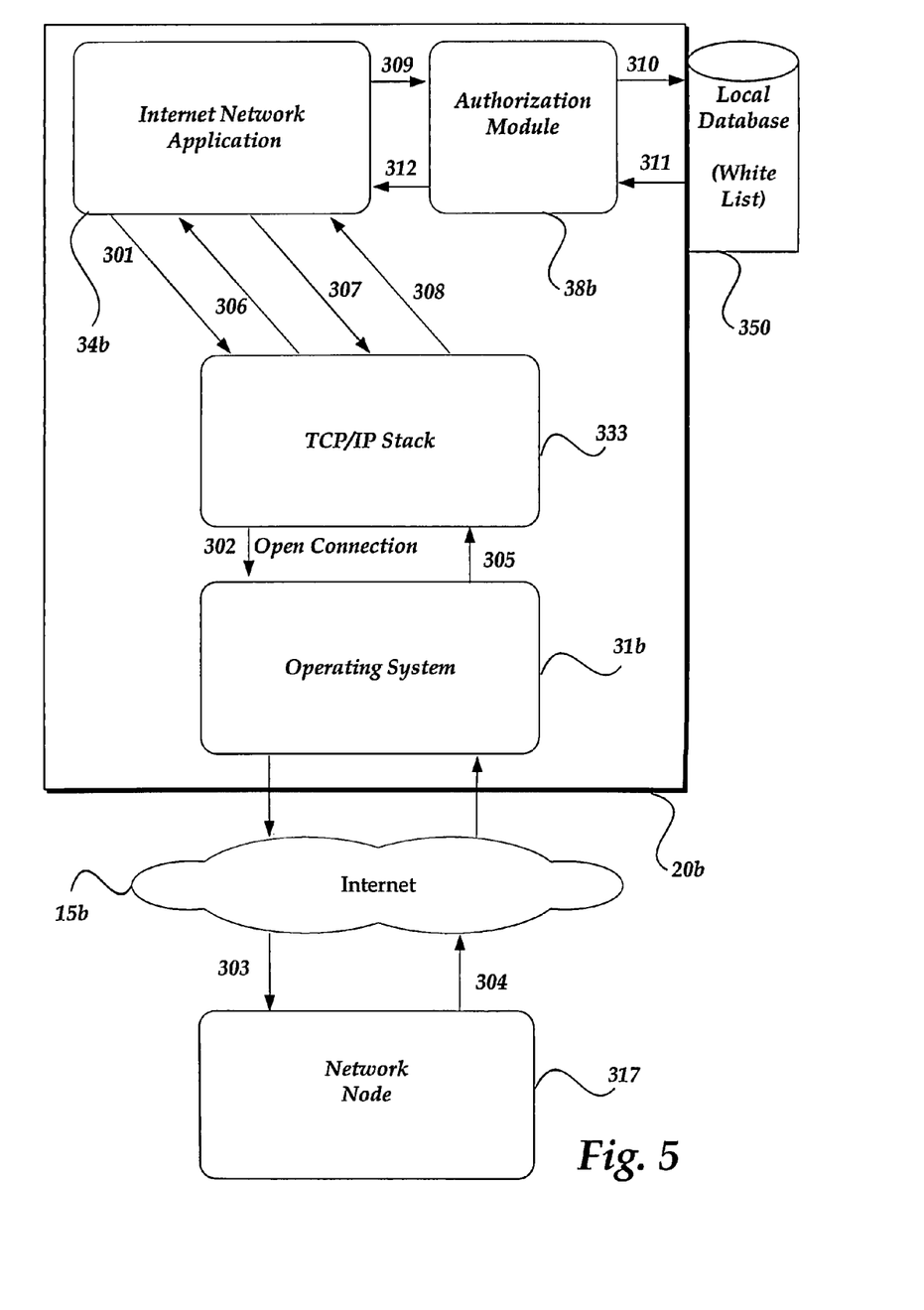
FIG. 5 illustrates an architecture and communication sequence for further embodiment of the present invention.

FIG. 5 illustrates an architecture, communication sequence, and method for a further embodiment of the present invention. Not all of the illustrated modules may be required to practice the invention, or additional modules may be included for other embodiments. In various embodiments, some modules may be combined, while other modules may be divided into multiple modules. Example scenarios are discussed relative to the following architecture.

In this example embodiment, the architecture includes a client 20b that communicates through a public internet 15b to an IP address of a Network Node 317 that corresponds to a website, an FTP site, or other internet service. Client 20b includes an operating system 31b in communication with internet 15b and in communication with a TCP/IP stack 333. TCP/IP stack 333 is in communication with an Internet Network Application 34b, which is in communication with an Authorization module 38b. The Internet Network Application 34b may be an email application or other application that can be used to prevent communications involving a hacker, virus, or other undesired entity. The Authorization module is in communication with a local database 350, which may be included in client 20b or in communication with client 20b. Local database 350 generally comprises a white list storing an association between IP addresses, TCP/IP port number, category, security rating, domain names, their owners and/or other data.

Example Scenario 1: Outbound Connection

In this example embodiment, a user of client 20b may initiate an Internet connection, such as to a website. Internet Network Application 34b detects a user request for connection, at a communication step 301. The request is first sent to TCP/IP stack 333 to resolve domain name or URL into an IP address. Resolving domain name may require accessing a DNS. However, the IP address from a DNS may be masked or otherwise misleading. TCP/IP stack 333 sends the request through to operating system 31b at a communication step 302, and the operating system makes a TCP connection through the internet to the Network Node 317, at a communication step 303.

Network Node 317 (e.g., a website's corresponding server) returns the request at a communication step 304. Also returned is the accurate IP address and port number of the Network Entity. Client operating system 31b receives the IP address and port number, and passes this information to TCP/IP stack 333 at a communication step 305. The TCP/IP stack passes control to the application 34a at a communication step 306. The application program may determine a category code of any file or other data received from Network Node 317. At a communication step 307, the application requests the IP address and port number from the TCP/IP stack. For example, the Network Application may invoke a GetIPAddressBy-Name object or a GetHostByName object. The TCP/IP stack returns the IP address and port number to the application, at a communication step 308.

Network Application 34b then passes the IP address, port number, category code and other information to Authorization module 38b, at a communication step 309. The Authorization module uses this information to check database 350. The Authorization module may send a search request to database 350 with the IP address, port number, category code, and other information, at a communication step 310. Database 350 performs a search to determine whether the IP address and other information is included in the white list of trusted information. Database 350 may also determine an owner, country, security code, and/or other information associated with the IP address. Database 350 returns the requested information to Authorization module 38b, at a communication step 311. Authorization module 38b may pass the information directly to Network Application 34b. Based on whether the IP address and port number are in the white list, the Authorization module can send an instruction at step 312 to close the connection, reject information that was received, send out a warning message, waiting for a user decision, and/or other predefined action.

Example Scenario 2: Inbound Connection

Network Node 317 may request a connection to client 20b, at a communication step 304. Client operation system 31b receives this request, which includes the IP address and port number of Network Node 317. The request generally also includes the port number of Network Application 34b, to identify Network Application 34b as the resource that the Network Node desires to contact. The request may further include a file name or other information on the data that the Network Node desires. The operating system passes this information to TCP/IP stack 333 at a communication step 305. The TCP/IP stack passes this information to Internet Network Application 34b at a communication step 306.

Network Application 34b then passes the IP address, port number, and other information to Authorization module 38b, at a communication step 309. The Authorization module may determine a category code for any information that was requested by Network Node 317. The Authorization module uses this information to check database 350. The Authorization module may send a search request to database 350 with the IP address, port number, category code, and other information, at a communication step 310. Database 350 performs a search to determine whether the IP address and other information is included in the white list of trusted information. Database 350 may also determine an owner, country, security code, and/or other information associated with the IP address. Database 350 returns the requested information to Authorization module 38b, at a communication step 311. Authorization module 38b may pass the information directly to Network Application 34b. Based on whether the IP address and port number are in the white list, the Authorization module can send an instruction at step 312 to close the connection, reject information that was received, send out a warning message, waiting for a user decision, and/or other predefined action.

Example Scenario 3: Messaging

If the Network Application 34b is a messaging service, such as an email client like Microsoft Outlook™, it can check a received email header. In the header, there is a "Received From" field with the IP address and port number of the sending email device. The header may include other information such as IP addresses of devices associated with a courtesy copy (CC) recipient, an indication of any attachment to the received email, and/or other data. Network Application 34b may determine a category code of any attached file. The Network Application then passes the IP address, port number, and other information to Authorization module 38b, at a communication step 309. The Authorization module uses this information to determine whether the email sender is trusted. Specifically, the Authorization module sends the IP address and port number (and category code if available) in a search requests to database 350, at a communication step 310. The database checks for the IP address and port number in the white list. The database may also retrieve a domain name, email function code, security rating, and/or other data (if available). Database 350 returns the result of its search to Authorization 38a, at a communication step 311. Authorization module 38b may pass the information directly to Email Network Application 34b. Based on whether the IP address and port number are in the white list, the Authorization module can send an instruction at step 312 to delete the email, redirected the email (e.g., to a junk folder), send a warning, wait for a user instruction, and/or other action.

In more detail, an exemplary embodiment of the present invention may comprise an Internet Email system using simple mail transport protocol (SMTP). For Internet Email, SMPT is used to deliver or retrieve mail. This is generally done through an intermediary mail server. When receiving email, the mail server will receive the IP address and TCP/UDP port number of a sending mail client. The mail server will add the sender's IP address to the "Received From" field of the email header. As described above, the IP address can be verified.

Another embodiment of such verification may also include a reverse DNS lookup by the mail server to authenticate a domain name of the email sender. It is noted that some mail servers use domain information to block spam email. Spam blocking may use domain information to check the mail server domain and/or the client sender's domain. However, as discussed above, domain information may be masked. With or without DNS lookup, embodiments of the current invention verify the email sender by checking the actual IP address of an email against a white list database. Nevertheless, additional information, such as the owner and country can be checked from domain information obtained from the IP address information in the email header. Additional confidence can be obtained by using a domain lookup to ensure that the received IP address is associated with the domain indicated in the received email address. For instance, the Authentication module may use the IP address from an email header to search a white list, or a domain assignment service, to determine a domain name associated with the IP address. The Authorization module can then compare the determined domain name against the domain name specified in the "Received From" field of the email message. If the domain names do not match, the message may be illegitimate. Even if the IP address and port number from the message match those in the white list, a differing domain name may indicate that a hacker accessed a trusted network node, and is using that trusted network node for spam messages or other undesired activities.

If the Email has been forwarded/relayed by another SMTP server, it's the receiver email client will also check if the forwarding/relaying mail server is trustworthy. If the email header is incomplete or the forwarding/relaying mail server can not be used to identify the sender, the Authorization module can delete the email, or take other action discussed above.

Also, for SMPT email, the sender uses an email domain like xxxx@msn.com. With just the domain name, there is generally no easy way to identify whether this email is from a general MSN user or from a member of an important organization within MSN, such as an accounting or administration department. Being able to determine this level of detail is a function that a financial institution or other organization may want to have.

To solve this problem, the sending email service can establish multiple IP address for a certain department. Some IP addresses may be for general users. The other IP addresses can be used for special users and/or other special purpose. In this way, a financial institution or other organization can send a financial information email to their customers. In addition, or alternatively, the TCP/IP port can be used to support this function. This is useful if limited IP addresses are available for Internet mail services. In yet another embodiment, a sub-organization code can be included in communications and/or added to the white list database to identify sub-organizations or other categorization of emails. Similarly, a function code can be included in communications and/or added to the white list database to indicate a purpose for the communication. The customers' client devices can use an embodiment of the present invention to authenticate the sender, and check the codes for acceptable organizations and/or function codes, which may distinguish valid emails from phishing emails.

As with the warning displays for phishing websites, an email client can provide a display field. The email client may also provide a menu option to control the validation. When a user receives an email, the menu option and/or display field enable the user to identify the email sender, the sub-organization, and/or other functions/data. In one embodiment, the receiver email client will automatically compare the IP address, port number, and domain name of the sender and against a local white list database. If the sender's IP address, port number, and domain name are not in the database, or are different from those entries in the database, a display field is used to indicate that the email may not actually come from the sender shown in the email address. Alternatively, the user may activate a menu option to perform this check, to display information about the email or sender, and/or to perform other operations.

The above specification, examples, and data provide a complete description of the manufacture and use of the composition of the invention. For example, digital certificates may be used for authentication, encryption may be used for communications, and other features may be included. However other embodiments will be clear to one skilled in the art. Since many embodiments of the invention can be made without departing from the spirit and scope of the invention, the invention resides in the claims hereinafter appended.

What is claimed as new and desired to be protected by Letters Patent is:

1. A method in a computing system for controlling communication, comprising:
in a computing system communicating via a TCP/IP stack, evaluating a new network communication with a network resource by reference to a predefined white list of trusted network addresses that does not include addresses for any unauthenticated network nodes or anonymous proxy servers, by:
receiving from the TCP/IP stack an internet protocol (IP) address and port number of a network address corresponding to the network resource;
receiving a uniform resource locator (URL) associated with the network resource;
determining a first name associated with the IP address, by querying the IP address received from the TCP/IP stack against an assignment database that associates owner names with IP addresses;
determining a second name associated with the URL, by querying a domain name of the URL associated with the network resource against an assignment database that associates owner names with domain names;
determining a security rating level of the network resource based on:
determining whether the IP address and port number of the network address are included in the predefined white list of trusted network addresses; and
determining whether the first name matches the second name; and
setting an indicator that a communication operation is allowed or not allowed based on the determined security rating level of the network resource.

2. The method of claim 1, wherein the network resource comprises a network node of one of the following: a network node that has requested a connection, a network node to which a connection request is to be sent, a website, a message sender, and/or a message destination.

3. The method of claim 1, wherein the determining the security level further comprises:
determining a category code indicating a type of information contained in payload data associated with the corresponding network address; and
when the determined category code matches a predefined category code of allowed category codes, setting a medium security level, otherwise setting a low security level.

4. The method of claim 1, wherein the corresponding network address is obtained from a TCP/IP connection request.

5. The method of claim 1, further comprising:
receiving the new network communication from a network resource for the corresponding address; and
using a domain name resource to retrieve a domain name associated with the network address.

6. The method of claim 1, wherein the predefined white list of trusted network addresses comprises a list of network nodes, wherein each network node is associated with at least one of the following: a commercial institution, a website, an anti-virus source, a network service provider, and/or an internet service provider.

7. The method of claim 1, further comprising:
determining which domain name is assigned to the corresponding network address, as a result of the determination, setting the indicator to one of the following:
the communication operation is not allowed;
a warning is to be provided prior to allowing the communication operation; and/or
an instruction is needed from a user to determine whether the communication operation is allowed.

8. The method of claim 1, wherein the assignment database that associates owner names with IP addresses comprises at least one of the following: an international assignment registry, a regional registry, a local registry, and/or the list of trusted network addresses.

9. The method of claim 1, further comprising:
receiving a function code;
determining a communication operation based on the function code; and
providing to a user an indication of the communication operation.

10. The method of claim 1, further comprising:
receiving an intermediary network address of an intermediary network node that has relayed the corresponding network address;
determining whether the intermediary network address is included in the predefined white list of trusted network addresses; and
setting the indicator that the communication operation is not allowed with the received network resource when the intermediary network address is not included in the predefined white list of trusted network addresses.

11. A non-transitory computer readable medium, comprising executable instructions for causing a computing device to perform the method of claim 1.

12. The method of claim 1, further comprising:
receiving a category code indicating a type of information contained in payload data associated with the corresponding network address, wherein each network address in the predefined white list of trusted network addresses is associated with one or more category codes that are trusted for the network address, and wherein determining whether the IP address and port number are included in the predefined white list of trusted network addresses further comprises determining whether the received category code is indicated in the list of trusted network addresses as trusted for the IP address and the port number of the corresponding network address.

13. The method of claim 1, further comprising:
receiving a category code indicating a type of information contained in payload data associated with the corresponding network address, wherein each network address in the predefined white list of trusted network addresses includes an IP address, and a category code, and wherein determining whether the received corresponding network address and the received category code are included in the predefined white list of trusted network address includes determining whether one of the network addresses in the predefined white list of trusted network addresses includes the IP address and the received category code.

14. The method of claim 1, wherein the white list of trusted network addresses includes multiple IP addresses of trustworthy nodes, wherein the white list includes, for each of the multiple IP addresses, a port number, a category code that indicates a type of allowable payload data, an owner name, and a domain name.

15. The method of claim 14, further comprising:
selectively providing multiple tiers of security, the multiple tiers including a first tier that evaluates communication based on an IP address, a second tier that evaluates communication based on port number, and a third tier that evaluates communication based on category code.

16. The method of claim 14, wherein the white list includes a security rating, and further comprising:
when the security rating in the white list is a first security rating, automatically evaluating the new network communication without user intervention; and
when the security rating in the white list is a second security rating, requiring user interaction to allow the new network communication.

17. A system for controlling communication, comprising:
a communication interface for communication with a network resource, the communication interface including a TCP/IP stack;
a memory for storing instructions; and
a processor in communication with the communication interface and with the memory, wherein the processor is configured to evaluate a new network communication with a network resource by reference to a predetermined white list of trusted network addresses that does not include addresses for any unauthenticated network nodes or anonymous proxy servers, by:
receiving from the TCP/IP stack an internet protocol (IP) address and port number of a network address corresponding to the network resource;
receiving a uniform resource locator (URL) associated with the network resource;
determining a first name associated with the IP address, by querying the IP address received from the TCP/IP stack against an assignment database that associates owner names with IP addresses;
determining a second name associated with the URL, by querying a domain name of the URL associated with the network resource against an assignment database that associates owner names with domain names;
determining a security rating level of the network resource based on:
determining whether the IP address and port number of the network address are included in the predefined white list of trusted network addresses; and
determining whether the first name matches the second name; and
setting an indicator that a communication operation is allowed or not allowed based on the determined security rating level of the network resource.

18. The system of claim 17, wherein the corresponding network address further comprises an internal address behind a firewall or a proxy server.

19. The system of claim 17, wherein the processor further configured to retrieve a domain name associated with the network address corresponding to the network resource.

20. The system of claim 17, wherein the processor is further configured to:
determine which domain name is assigned to the corresponding network address, as a result of the determination, setting the indicator to one of the following:
the communication operation is not allowed;
a warning is to be provided prior to allowing the communication operation; and
an instruction is needed from a user to determine whether the communication operation is allowed.

21. The system of claim 17, further comprising an output device, and/or wherein the processor is further configured to:
receive a function code;
determine a communication operation based on the function code; and/or
provide to a user an indication of the communication operation.

22. The system of claim 17 wherein the system comprises a general purpose computing device and/or a mobile device.

23. The system of claim 17, wherein the processor is configured to:
receive a category code indicating a type of information contained in payload data associated with the corresponding network address, wherein each network address in the predefined white list of trusted network addresses is associated with one or more category codes that are trusted for the network address, and wherein determining whether the IP address and port number are included in the predefined white list of trusted network addresses further comprises determining whether the received category code is indicated in the list of trusted network addresses as trusted for the IP address and the port number of the corresponding network address.

* * * * *